US012238744B2

(12) United States Patent
Ying et al.

(10) Patent No.: US 12,238,744 B2
(45) Date of Patent: Feb. 25, 2025

(54) RESOURCE ALLOCATION IN IAB NETWORKS

(71) Applicant: Apple Inc., Cupertino, CA (US)

(72) Inventors: Dawei Ying, Hillsboro, OR (US); Lili Wei, Portland, OR (US); Qian Li, Beaverton, OR (US); Hassan Ghozlan, Hillsboro, OR (US); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 737 days.

(21) Appl. No.: 17/295,080

(22) PCT Filed: Nov. 26, 2019

(86) PCT No.: PCT/US2019/063302
§ 371 (c)(1),
(2) Date: May 19, 2021

(87) PCT Pub. No.: WO2020/112811
PCT Pub. Date: Jun. 4, 2020

(65) Prior Publication Data
US 2022/0015093 A1   Jan. 13, 2022

Related U.S. Application Data

(60) Provisional application No. 62/773,053, filed on Nov. 29, 2018.

(51) Int. Cl.
*H04W 72/27* (2023.01)
*H04L 5/14* (2006.01)
(Continued)

(52) U.S. Cl.
CPC ........... *H04W 72/27* (2023.01); *H04L 5/1423* (2013.01); *H04L 5/1469* (2013.01); *H04W 72/0446* (2013.01); *H04W 92/24* (2013.01)

(58) Field of Classification Search
CPC ............. H04W 72/27; H04W 72/0446; H04W 72/23; H04W 92/24; H04L 5/1423;
(Continued)

(56) References Cited

U.S. PATENT DOCUMENTS

2015/0229461 A1   8/2015 Difazio
2017/0208574 A1   7/2017 Ramakrishna
(Continued)

FOREIGN PATENT DOCUMENTS

CN   103518413   1/2014
CN   106304352   1/2017
(Continued)

OTHER PUBLICATIONS

Nokia et al., "Resource Allocation/Coordination Between Parent BH and Child Links", 3GPP TSG RAN WG1, Meeting #95, R1-1812702, Nov. 2018, Spokane, USA, 11 pgs.
(Continued)

*Primary Examiner* — Jianye Wu
(74) *Attorney, Agent, or Firm* — Kowert, Hood, Munyon, Rankin & Goetzel, P.C.

(57) ABSTRACT

An apparatus of an Integrated Access and Backhaul (IAB) node includes processing circuitry coupled to a memory. To configure the IAB node for resource allocation within an IAB network, the processing circuitry is to decode radio resource control (RRC) signaling from a central unit (CU) function of an IAB donor node. The RRC signaling configures first time-domain resources for a parent backhaul link between a mobile termination (M) function of the IAB node and a distributed unit (DU) function of a parent IAB node, and second time-domain resources for a child backhaul link between a DU function of the IAB node and a MT function of a child IAB node. Uplink data is encoded for transmission to the parent IAB node based on the first time-domain
(Continued)

resources. Downlink data is encoded for transmission to the child IAB node based on the second time-domain resources.

20 Claims, 10 Drawing Sheets

(51) Int. Cl.
*H04W 72/0446* (2023.01)
*H04W 92/24* (2009.01)

(58) Field of Classification Search
CPC .............. H04L 5/1469; H04L 5/0044; H04L 5/0094; H04B 7/15542
See application file for complete search history.

(56) References Cited

U.S. PATENT DOCUMENTS

| | | | |
|---|---|---|---|
| 2018/0049190 A1 | 2/2018 | Abedini et al. | |
| 2018/0167961 A1 | 6/2018 | Hao | |
| 2018/0192443 A1 | 7/2018 | Novlan et al. | |
| 2021/0400660 A1* | 12/2021 | Wei | H04W 80/02 |

FOREIGN PATENT DOCUMENTS

| | | |
|---|---|---|
| GB | 2576202 | 9/2018 |
| WO | 2014036025 | 3/2014 |

OTHER PUBLICATIONS

Huawei et al., "On Resource Coordination and Dynamic Scheduling in IAB", 3GPP TSG RAN WG1, Meeting #95, R1-1812201, Nov. 2018, Spokane, USA, 5 pgs.

Qualcomm Incorporated, "Resource Management in IAB Network", 3GPP TSG RAN WG1, Meeting #95, R1-1813419, Nov. 2018, Spokane, USA, 8 pgs.

International Search Report and Written Opinion for International Application No. PCT/US2019/063302, mailed Mar. 20, 2020, 9 pgs.

Office Action for CN Patent Application No. 201980077984.4; Oct. 20, 2023.

Haiyan et al. "Information Science & Technology"; China Academic Journal Electronic Publishing House; Jul. 15, 2017.

Alvizu et al. "Comprehensive Survey on T-SDN: Software-Defined Networking for Transport Networks"; IEEE Communications Surveys & Tutorials; Jun. 13, 2017.

* cited by examiner

RESOURCE ALLOCATION IN IAB NETWORKS

PRIORITY CLAIM

This application is a U.S. National Stage filing of International Application No. PCT/US2019/063302, filed Nov. 26, 2019, which claims the benefit of priority to U.S. Provisional Application No. 62/773,053, filed Nov. 29, 2018. Each of the aforementioned Applications is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for resource allocation in integrated access and backhaul (IAB) networks, including time-domain resource allocation in IAB networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for resource allocation in IAB networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
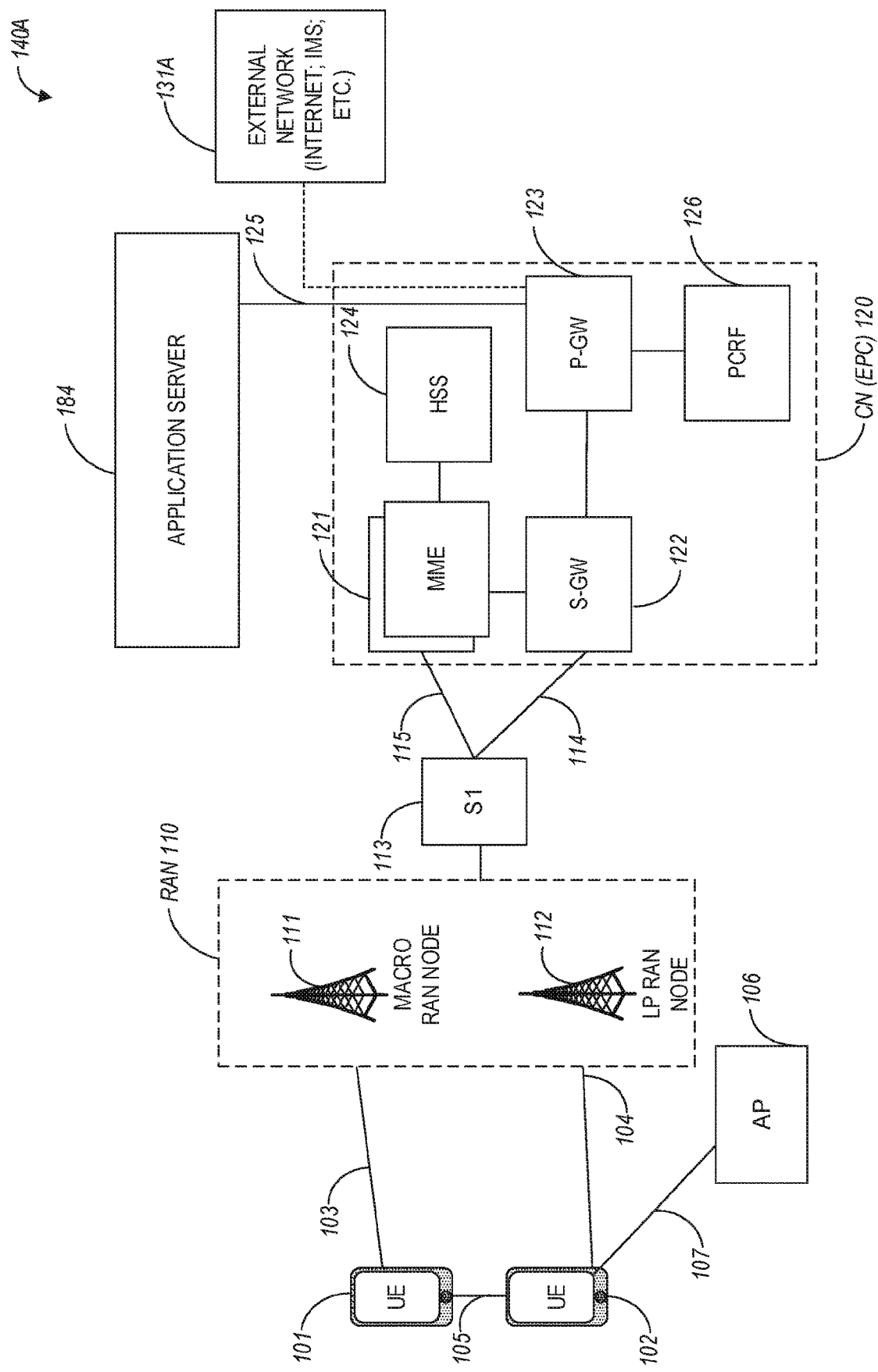
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts; the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018 December). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
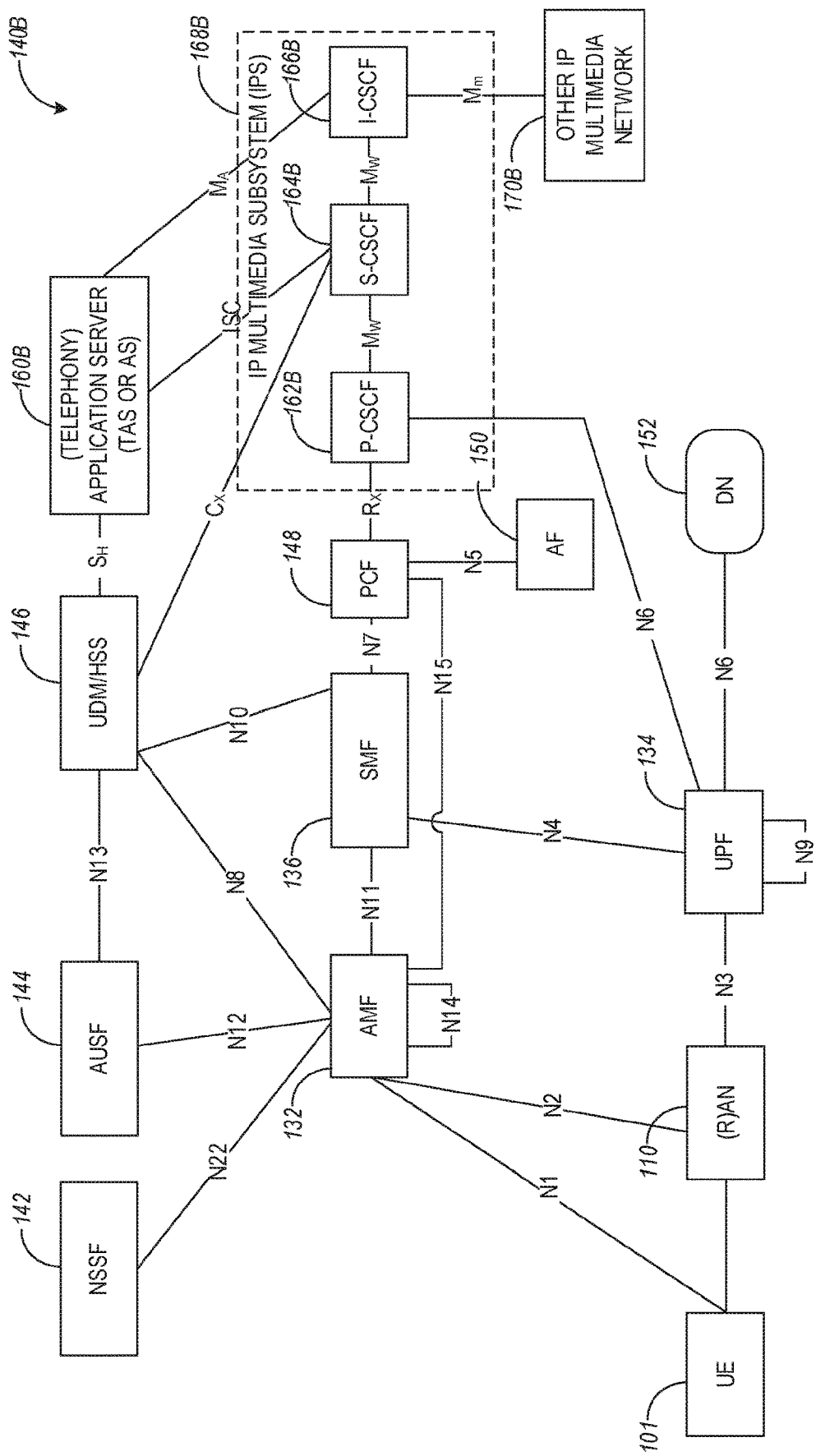
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
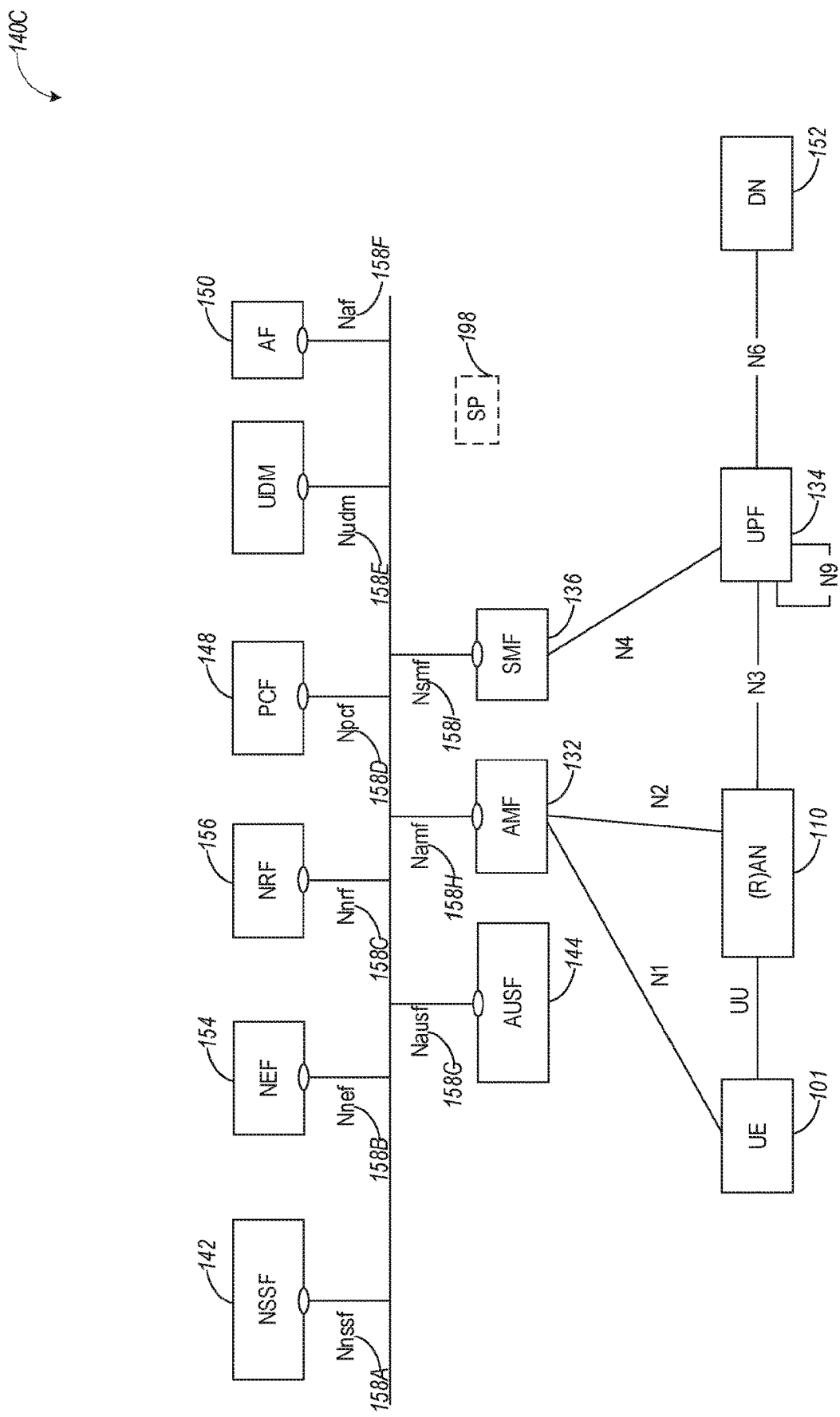

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE, a base station (e.g., any of the UEs or base stations discussed in connection with FIG. 1A-FIG. 1C), or any of the nodes in the Integrated Access and Backhaul (IAB) communication systems discussed in connection with FIGS. 2-5.

For an IAB network, in order for cell detection and measurement to take place, the IAB-donor or an IAB-node may transmit its own synchronization signal block (SSB) to an access UEs or other IAB-nodes (which may be performing initial access and cell discovery). In some embodiments, an IAB node can transmit two sets of SSBs, one SSB (e.g., SSB-A) for access UEs and another SSB (e.g., SSB-B) for other JAB nodes/backhaul links (e.g., nodes already connected in the IAB network that may need to perform inter-IAB node discovery and measurement). For the stand-alone (SA) scenario, the SSB (i.e., SSB-B) for inter-IAB cell search and measurement will be on an off-raster frequency set other than a synchronization raster frequency set used for SSB-A. Since current standards do not accommodate off-raster SSB, techniques disclosed herein can be used for a new design for off-raster SSB transmission/reception. More specifically, techniques disclosed herein can be used in connection with different aspects of off-raster SSB design, including increase periodicity, increase maximum number of candidate SSBs, SSB measurement tab configuration (SMTC) enhancements, and signaling enhancement for off-raster SSB.

Figure 2:
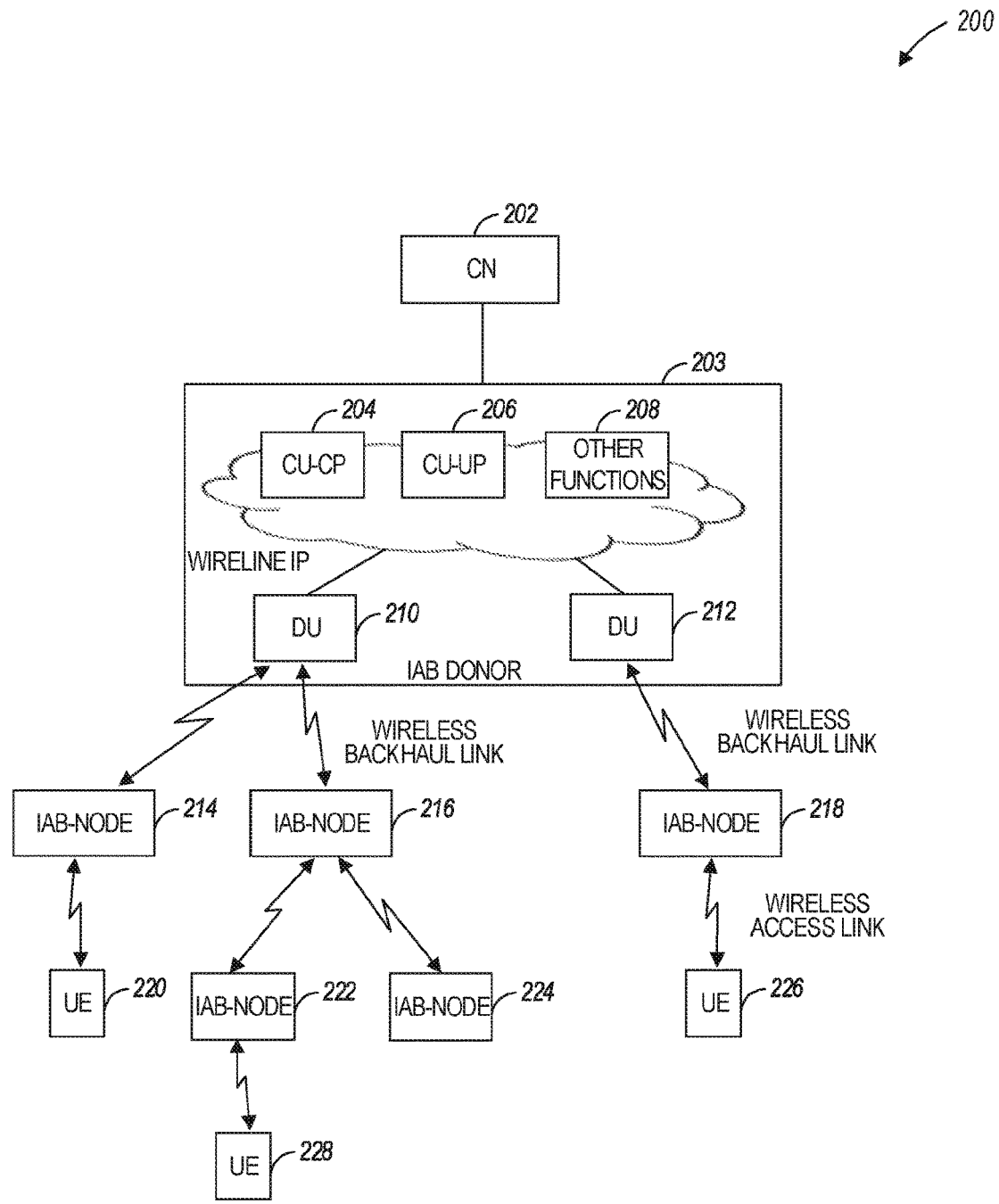
FIG. 2 illustrates a reference diagram of an IAB architecture, in accordance with some aspects.
Figure 3:
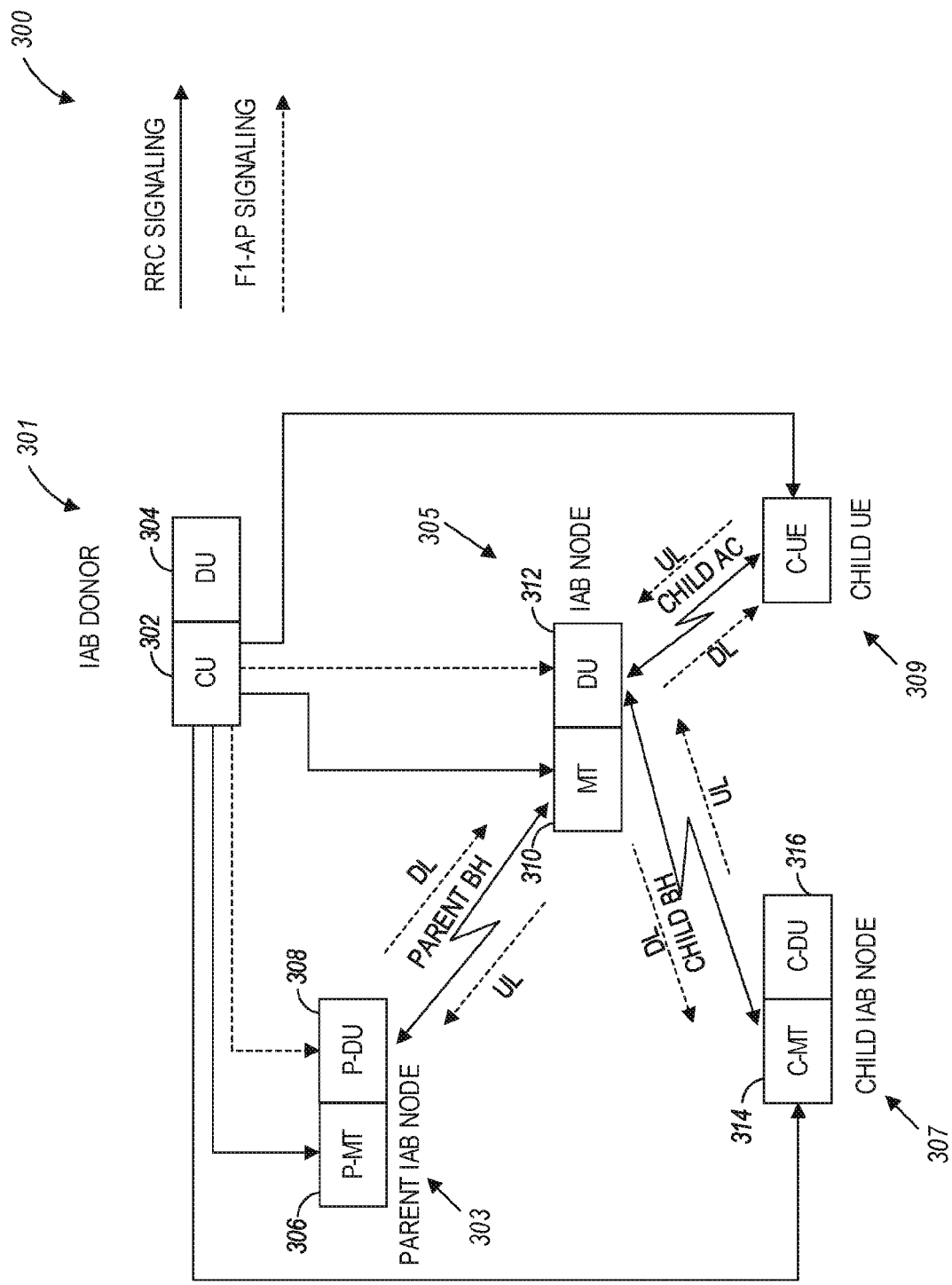
FIG. 3 illustrates a central unit (CU)-distributed unit (DU) split and signaling in an IAB architecture, in accordance with some aspects.

As illustrated in FIGS. 2-3, in an JAB network, an IAB node can connect to its parent node (an IAB donor or another IAB node) through a parent backhaul (BH) link, connect to a child user equipment (UE) through a child access (AC) link, and connect to a child IAB node through a child BH link.

In order for cell detection and measurement to take place, the IAB donor or an IAB node may transmit its own SSB for access UEs or other IAB nodes. From the perspective of a given IAB node, due to the half-duplex constraint, the IAB node may not transmit its own SSB and receive SSBs from other nodes at the same time.

In some aspects, for the purpose of inter-IAB node and donor detection after the IAB node's distributed unit (DU) becomes active (Stage 2), use of SSBs, which are orthogonal with SSBs used for access UEs (which is also called Solution 1B), may be supported. For Solution 1B, the following techniques may be used: (a) For a stand-alone (SA) architecture, SSB for inter-IAB cell search and measurement in Stage 2 is not on the currently defined sync raster; (b) SSB may get muted for inter-IAB cell search and measurement in stage 2; and (c) Since an IAB node should not mute SSB transmission targeting UE cell search and measurement when doing inter-IAB cell search in stage 2, SSB for inter-IAB search is at least TDM with SSB used for UE cell search and measurements.

In some aspects, in Solution 1B, an JAB node may transmit two sets of SSBs, one for access UEs (we denote it as SSB-A), and another for other IAB nodes/backhaul links (we denote it as SSB-B). For a SA scenario, SSB-B for inter-IAB cell search and measurement will be on an off-raster set of frequencies. SSB-A and SSB-B from the same IAB node may not only be frequency-division multiplexed (FDM) (e.g., on a synchronization raster and on an off-raster set of frequencies) but may also be time-division multiplexed (TDM) with each other, as illustrated in FIG. 4.

FIG. 2 shows a reference diagram for IAB in a standalone mode, which contains one IAB donor node 203 and multiple IAB nodes (e.g., 214, 216, 218, 222, and 224). Referring to FIG. 2, the IAB architecture 200 can include a core network (CN) 202 coupled to an IAB donor node 203. The IAB donor node 203 can include control unit control plane (CU-CP) function 204, control unit user plane (CU-UP) function 206, other functions 208, and distributed unit (DU) functions 210 and 212. The DU function 210 can be coupled via wireless backhaul links to IAB nodes 214 and 216. The DU function 212 is coupled via a wireless backhaul link to IAB node 218. IAB node 214 is coupled to a UE 220 via a wireless access link, and IAB node 216 is coupled to IAB nodes 222 and 224. The IAB node 222 is coupled to UE 228 via a wireless access link. The IAB node 218 is coupled to UE 226 via a wireless access link.

Each of the IAB nodes illustrated in FIG. 2 can include a mobile termination (MT) function and a DU function. The MT function can be defined as a component of the mobile equipment and can be referred to as a function residing on an IAB-node that terminates the radio interface layers of the backhaul Uu interface toward the IAB-donor or other IAB-nodes.

The IAB donor 203 is treated as a single logical node that comprises a set of functions such as gNB-DU, gNB-CU-CP 204, gNB-CU-UP 206, and potentially other functions 208. In deployment, the IAB donor 203 can be split according to these functions, which can all be either collocated or non-collocated as allowed by 3GPP NG-RAN architecture. IAB-related aspects may arise when such a split is exercised. In some aspects, some of the functions presently associated with the IAB-donor may eventually be moved outside of the donor in case it becomes evident that they do not perform IAB-specific tasks.

FIG. 3 illustrates a central unit (CU)-distributed unit (DU) split and signaling in an IAB architecture 300, in accordance with some aspects. Referring to FIG. 3, the IAB architecture 300 includes an IAB donor 301, a parent IAB node 303, an IAB node 305, a child IAB node 307 and a child UE 309. The IAB donor 301 includes a CU function 302 and a DU function 304. The parent IAB node 303 includes a parent MT (P-MT) function 306 and a parent DU (P-DU) function 308. The IAB node 305 includes an MT function 310 and a DU function 312. The child IAB node 307 includes a child MT (C-MT) function 314 and a child DU (C-DU) function 316.

As illustrated in FIG. 3, RRC signaling can be used for communication between the CU function 302 of the IAB donor 301 and the MT functions 306, 310, and 314, as well as between the CU function 302 and the child UE (C-UE) 309. Additionally, F1 access protocol (F1-AP) signaling can be used for communication between the CU function 302 of the IAB donor 301 and the DU functions of the parent IAB node 303 and the IAB node 305.

As illustrated in FIGS. 2-3, multiple IAB nodes are connected to a donor node (DN) via a wireless backhaul. A DN or a parent IAB node needs to properly allocate resources for its child IAB node under the half-duplex constraint at the child IAB node. In some aspects, the time-frequency resource allocated to the parent link may be orthogonal to the time-frequency resource allocated to the child or access link.

Techniques discussed herein can be used for new signaling mechanisms for time-domain resource allocation in IAB networks (or other types of multi-hop networks). The proposed techniques can be used for, e.g., mobile IAB nodes or so-called "UE-type" relays. In some aspects, the resource allocation for parent links and child links can be configured using a single radio resource control (RRC) message or a single layer 1 (L1) message such as downlink control information (DCI) signaling.

Figure 4A:
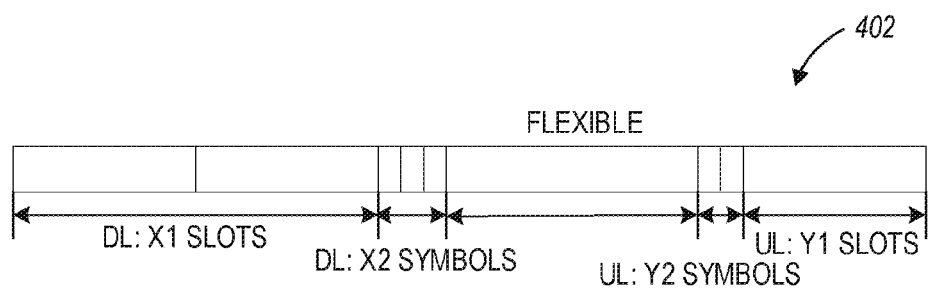
FIG. 4A illustrates a cell-specific uplink/downlink assignment in an NR communication system, in accordance with some aspects.
Figure 4B:
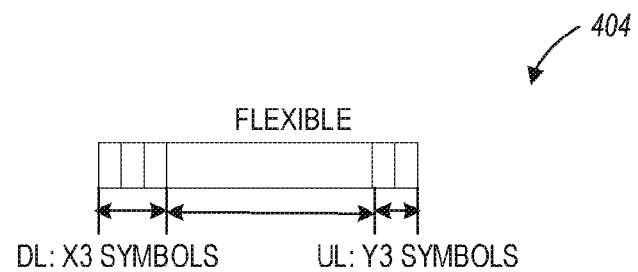
FIG. 4B illustrates a UE-specific uplink/downlink assignment in an NR communication system, in accordance with some aspects.

In some aspects, in NR communication networks, a transmission-reception point (TRP) may use RRC signaling TDD-UL-DL-ConfigCommon to configure cell-specific UL/DL resource assignment and may use TDD-UL-DL-ConfigDedicated to configure UE-specific UL/DL resource assignments. Both cell-specific and UE-specific resource assignments may follow the same UL/DL configuration pattern: DL-F-UL (where F indicates flexible resource assignment, meaning it may be used for UL or DL), which is demonstrated in FIG. 4A and FIG. 4B FIG. 4A illustrates a cell-specific uplink/downlink assignment 402 in an NR communication system, in accordance with some aspects. FIG. 4B illustrates a UE-specific uplink/downlink assignment 404 in an NR communication system, in accordance with some aspects.

In addition to the above semi-static UL/DL assignment, in some aspects, dynamic resource allocation in time-domain may be supported via L1 DCI signaling. For example, a set of slot format combinations are configured in RRC for a serving cell, and one or more slot format indices are defined within each slot format combination. In some aspects, DCI format 2_2 may be used to indicate which slot format combination is used for a number of slots.

RRC Signaling for Semi-Static IAB Resource Allocation

In some aspects associated with a frequency division duplex (FDD) system, the orthogonal resource allocation between a parent link and a child link may follow a pattern. In one embodiment, the resource allocation pattern may be defined as PL-X-CL, where PL denotes resources for the parent links, X denotes resources for undecided slots/symbols, and CL denotes resources for the child links.

In some aspects associated with a time division duplex (TDD) system, the existing UL/DL assignment can be further specified to (P, DL), (P, UL), (C, DL), (C, UL), (A, DL), (A, UL) for parent DL, parent UL, child DL, child UL, access DL, and access UL, respectively. Then, in one embodiment, the temporal IAB resource allocation may follow the pattern of (P, DL)-X-(C, DL)-X-(C, UL)-X-(P, UL).

Figure 5A:
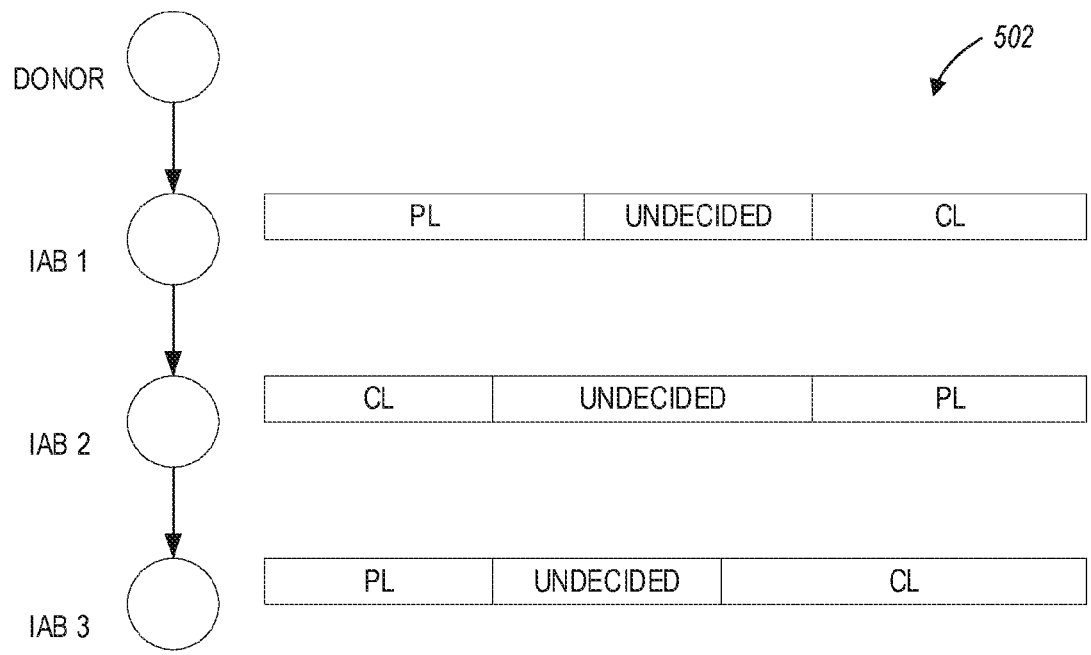
FIG. 5A illustrates a frequency division duplex (FDD) resource allocation pattern in an IAB network, in accordance with some aspects.
Figure 5B:
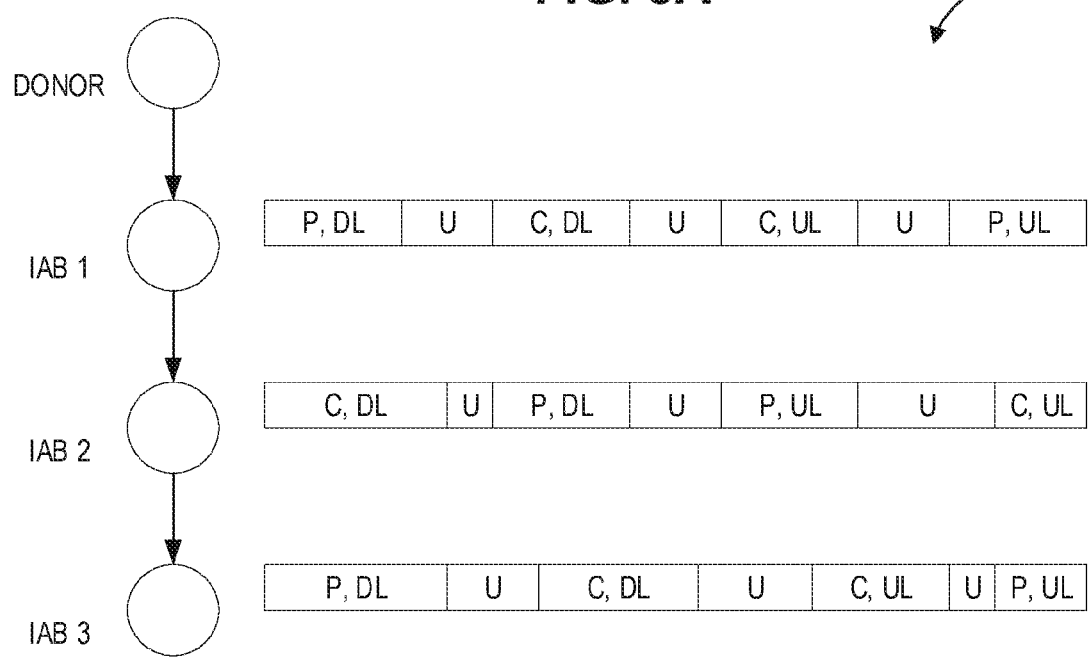
FIG. 5B illustrates a time division duplex (TDD) resource allocation pattern in an IAB network, in accordance with some aspects.

In some aspects, there may be no half-duplex constraint between the child link and the access link, hence, the child link and the access link may be multiplexed in another dimension (frequency or spatial domain). In this regard, (C, DL) and (A, DL) can both use the resource allocated for (C, DL). Similarly, (C, UL) and (A, UL) can both use the resource allocated for (C, UL). However, a single pattern may be inadequate in a multi-hop scenario, therefore, at least two types of resource allocation patterns may need to be defined for IAB resource allocation. FIGS. 5A-5B illustrate a multi-hop IAB network with interleaving patterns.

FIG. 5A illustrates a frequency division duplex (FDD) resource allocation pattern 502 in an IAB network, in accordance with some aspects. FIG. 5B illustrates a time division duplex (TDD) resource allocation pattern 504 in an IAB network, in accordance with some aspects.

In one embodiment with FDD, the odd-tier IAB nodes may use the PL-X-CL resource allocation pattern, and the even-tier IAB nodes may use CL-X-PL resource allocation pattern. In another embodiment with TDD, the odd-tier IAB nodes may use the following resource allocation pattern: (P, DL)-X-(C, DL)-X-(C, UL)-X-(P, UL), and the even-tier IAB nodes may use the following resource allocation pattern: (C, DL)-X-(P, DL)-X-(P, UL)-X-(C, UL). In some aspects, the CU function (e.g., associated with a donor node) may ensure the resource allocation complies with the half-duplex constraints at all of its connecting IAB nodes.

Cell-Specific Time-Domain Allocation Using RRC Signaling

Figure 6A:
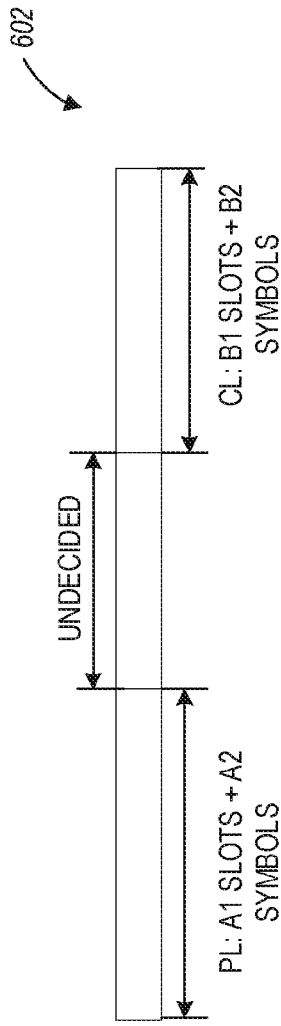
FIG. 6A illustrates a cell-specific FDD resource allocation with time-division multiplexing (TDM), in accordance with some aspects.
Figure 6B:
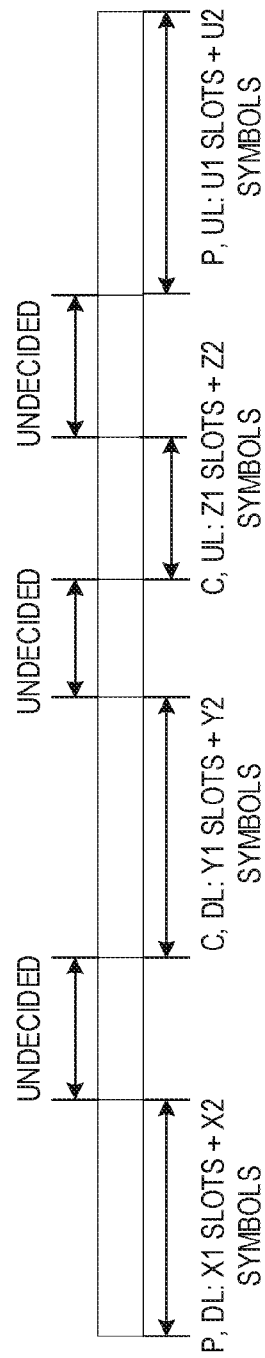
FIG. 6B illustrates a cell-specific TDD resource allocation with TDM, in accordance with some aspects.
Figure 6C:
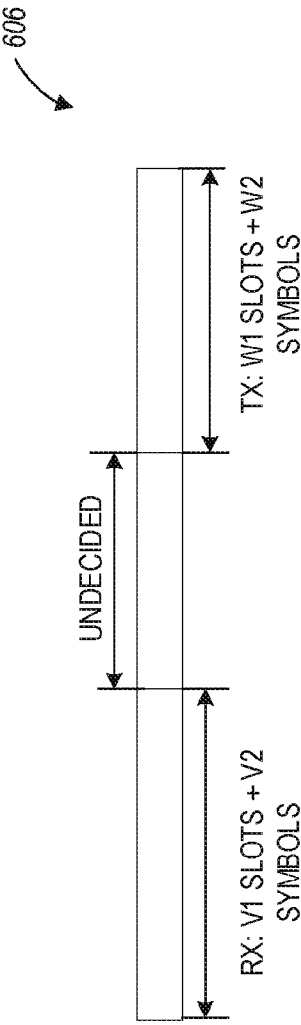
FIG. 6C illustrates a cell-specific resource allocation with spatial domain multiplexing (SDM)/frequency division multiplexing (FDM), in accordance with some aspects.

FIGS. 6A-6C illustrate three types of resource allocation assignments. In a multi-hop scenario, conjugate patterns can be defined as mentioned in the previous section. FIG. 6A illustrates a cell-specific FDD resource allocation 602 with time-division multiplexing (TDM), in accordance with some aspects. FIG. 6B illustrates a cell-specific TDD resource allocation 604 with TDM, in accordance with some aspects. FIG. 6C illustrates a cell-specific resource allocation 606 with spatial domain multiplexing (SDM)/frequency division multiplexing (FDM), in accordance with some aspects.

In some aspects, slot and symbol length may be based on the reference subcarrier spacing configured by the DN.

In one embodiment, new RRC signaling (e.g., RRC fields within RRC signaling) is defined (as provided in TABLE 1 below) to signal cell-specific FDD resource allocation between parent link and child link for IAB nodes

TABLE 1

FDD-PL-CL-ConfigCommon ::= SEQUENCE{
   pattern1              FDD-PL-CL-Pattern, TABLE 1-continued

```
    pattern2              FDD-PL-CL-Pattern,
    ...
}
FDD-PL-CL-Pattern ::= SEQUENCE{
    periodicity           ENUMERATED {ms1, ms2, ...},
    format                ENUMERATED {Format 1, Format 2},
    nParentlinkSlots      INTEGER (0..maxNSlots-1),
    nParentlinkSymbols    INTEGER (0..maxNSymbols-1),
    nChildlinkSlots       INTEGER (0..maxNSlots-1),
    nChildlinkSymbols     INTEGER (0..maxNSymbols-1),
}
```

The field descriptions for TABLE 1 are as follows: periodicity (periodicity of the allocation pattern); format (Format 1: PL-X-CL pattern; Format 2: CL-X-PL pattern); nParentlinkSlots (Number of consecutive slots allocated to parent link); nParentlinkSymbols (Number of consecutive symbols allocated to parent link); nChildlinkSlots (Number of consecutive slots allocated to child/access link); and nChildlinkSymbols (Number of consecutive symbols allocated to child/access link).

In another embodiment, new RRC signaling is defined (as provided in TABLE 2 below) to signal cell-specific TDD resource allocation between parent link and child link for IAB nodes.

TABLE 2

```
TDD-PL-CL-ConfigCommon ::= SEQUENCE{
    pattern1              TDD-PL-CL-Pattern,
    pattern2              TDD-PL-CL-Pattern,
    ...
}
TDD-PL-CL-Pattern ::= SEQUENCE{
    periodicity           ENUMERATED {ms1, ms2, ...},
format                    ENUMERATED {Format 1, Format 2},
    nParentDownlinkSlots      INTEGER (0..maxNSlots-1),
    nParentDownlinkSymbols    INTEGER (0..maxNSymbols-1),
    nChildDownlinkSlots       INTEGER (0..maxNSlots-1),
    nChildDownlinkSymbols     INTEGER (0..maxNSymbols-1),
nParentUplinkSlots            INTEGER (0..maxNSlots-1),
    nParentUplinkSymbols      INTEGER (0..maxNSymbols-1),
    nChildUplinkSlots         INTEGER (0..maxNSlots-1),
    nChildUplinkSymbols       INTEGER
                              (0..maxNSymbols-1),
    nUndecidedSlots           INTEGER (0..maxNSlots-1),
    nUndecidedSymbols         INTEGER (0..maxNSymbols-1),
}
```

The field descriptions for TABLE 2 are as follows: format (Format 1: (P, DL)-X-(C, DL)-X-(C, UL)-X-(P, UL); Format 2: (C, DL)-X-(P, DL)-X-(P, UL)-X-(C, UL)); nUndecidedSlots (Number of consecutive slots marked as undecided in the pattern, and it is used for the 1st and 3rd X-period); and nUndecidedSymbols (Number of consecutive symbols marked as undecided in the pattern, and it is used for the 1st and 3rd X-period).

In yet another embodiment, new RRC fields are defined (as provided in TABLE 3 below) to signal cell-specific resource allocation for IAB nodes with SDM/FDM between adjacent links.

TABLE 3

```
SDM-ConfigCommon ::= SEQUENCE{
    pattern1              SDM-Pattern,
    pattern2              SDM-Pattern,
    ...
}
SDM-Pattern ::= SEQUENCE{
    periodicity           ENUMERATED {ms1, ms2, ...},
    format                ENUMERATED {Format 1, Format 2},
    nRxSlots              INTEGER (0..maxNSlots-1),
```

TABLE 3-continued

```
    nRxSymbols            INTEGER (0..maxNSymbols-1),
    nTxSlots              INTEGER (0..maxNSlots-1),
    nTxSymbols            INTEGER (0..maxNSymbols-1),
}
```

The field descriptions for TABLE 3 are as follows: format (Format 1: RX-X-TX; Format 2: TX-X-RX); nRxSlots (Number of consecutive slots allocated to receive parent and child/access link simultaneously using SDM/FDM); nRxSymbols (Number of consecutive symbols allocated to receive parent and child/access link simultaneously using SDM/FDM); nTxSlots (Number of consecutive slots allocated to transmit parent and child/access link simultaneously using SDM/FDM); and nTxSymbols (Number of consecutive symbols allocated to transmit parent and child/access link simultaneously using SDM/FDM).

IAB-Specific Time-Domain Resource Allocation Using RRC Signaling

Figure 7A:
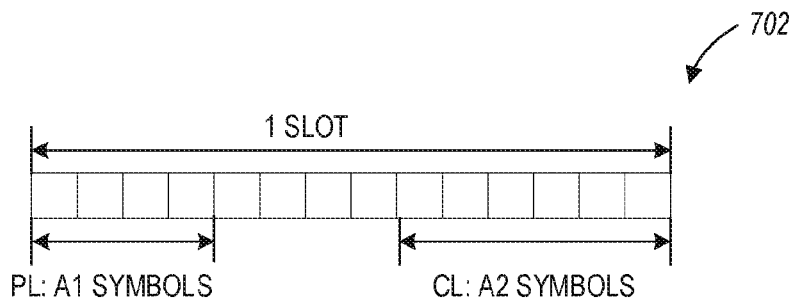
FIG. 7A illustrates an IAB-specific FDD resource allocation, in accordance with some aspects.
Figure 7B:
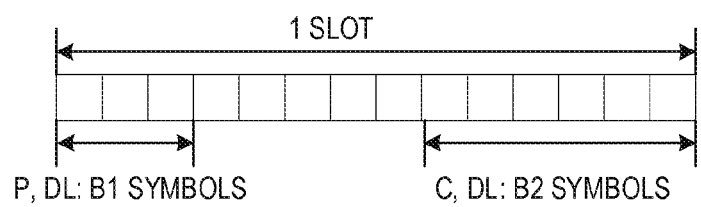
FIG. 7B and FIG. 7C illustrate IAB-specific TDD resource allocations, in accordance with some aspects.
Figure 7C:
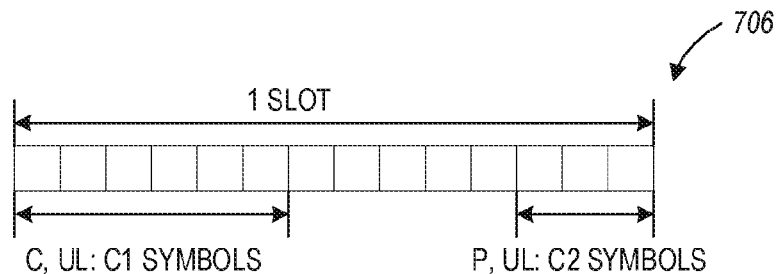
Figure 7D:
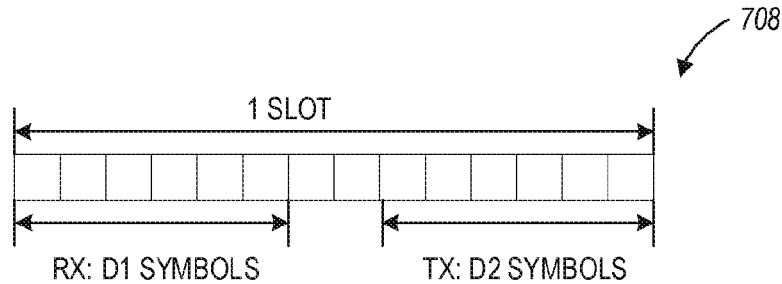
FIG. 7D illustrates an IAB-specific resource allocation with SDM, in accordance with some aspects.

FIGS. 7A-7D illustrate examples of IAB-specific time-domain resource allocation. FIG. 7A illustrates an IAB-specific FDD resource allocation 702, in accordance with some aspects. FIG. 7B and FIG. 7C illustrate IAB-specific TDD resource allocations 704 and 706, in accordance with some aspects. FIG. 7D illustrates an IAB-specific time-domain resource allocation 708 with SDM, in accordance with some aspects.

In one embodiment, new RRC signaling is defined (as provided in TABLE 4 below) to signal IAB-specific FDD resource allocation for IAB nodes.

TABLE 4

```
FDD-PL-CL-ConfigDedicated ::= SEQUENCE{
    slotSpecificConfigToAddModList     SEQUENCE (size
(1..maxNSlots)) of FDD-PL-CL-SlotConfig,
    slotSpecificConfigToReleaseList    SEQUENCE (size
(1..maxNSlots)) of FDD-PL-CL-SlotIndex,
    ...
}
FDD-PL-CL-SlotConfig ::= SEQUENCE{
    slotIndex             FDD-PL-CL-SlotIndex,
    format                ENUMERATED {Format 1, Format 2},
    nParentlinkSymbols    INTEGER (0..maxNSymbols-1),
    nChildlinkSymbols     INTEGER (0..maxNSymbols-1),
}
FDD-PL-CL-SlotIndex ::= INTEGER (0..maxNSlots-1)
```

The field descriptions for TABLE 4 are as follows: slotSpecificConfigToAddModList (The IAB-specific resource allocation overwrites an "Undecided" slot in the cell-specific configuration); slotIndex (Index of which slot the IAB-specific configuration applies); nParentlinkSymbols (Number of consecutive symbols allocated to parent link); and nChildlinkSymbols (Number of consecutive symbols allocated to child/access link).

In one embodiment, new RRC signaling is defined (as provided in TABLE 5 below) to signal IAB-specific TDD resource allocation.

TABLE 5

```
TDD-PL-CL-ConfigDedicated ::= SEQUENCE{
    slotSpecificConfigToAddModList     SEQUENCE (size
(1..maxNSlots)) of TDD-PL-CL-SlotConfig,
    slotSpecificConfigToReleaseList    SEQUENCE (size
(1..maxNSlots)) of TDD-PL-CL-SlotIndex,
    ...
}
TDD-PL-CL-SlotConfig ::= SEQUENCE{
    slotIndex             TDD-PL-CL-SlotIndex,
    format                ENUMERATED {Format 1, Format 2,
```

TABLE 5-continued

```
Format 3, Format 4, Format 5, Format 6},
    nParentlinkSymbols    INTEGER (0..maxNSymbols-1),
    nChildlinkSymbols     INTEGER (0..maxNSymbols-1),
}
TDD-PL-CL-SlotIndex ::= INTEGER (0..maxNSlots-1)
```

The field descriptions for TABLE 5 are as follows: slotSpecificConfigToAddModList (The IAB-specific resource allocation overwrites an "Undecided" slot in the cell-specific configuration); format (Format 1: P,DL-X-C,DL; Format 2: C,DL-X-C,UL; Format 3: C,UL-X-P,UL; Format 4: C,DL-X-P,DL; Format 5: P,DL-X-P,UL; Format 6: P,UL-X-C,UL); slotIndex (Index of which slot the IAB-specific configuration applies); nParentDownlinkSymbols (Number of consecutive symbols allocated to parent downlink); nParentUplinkSymbols (Number of consecutive symbols allocated to parent uplink); nChildDownlinkSymbols (Number of consecutive symbols allocated to child/access downlink); and nChildUplinkSymbols (Number of consecutive symbols allocated to child/access uplink).

In another embodiment, new RRC signaling is defined (as provided in TABLE 6 below) to signal IAB-specific resource allocation for spatial domain multiplexing (SDM).

TABLE 6

```
SDM-PL-CL-ConfigDedicated ::= SEQUENCE{
    slotSpecificConfigToAddModList    SEQUENCE (size
(1..maxNSlots)) of SDM-Pattern-SlotConfig,
    slotSpecificConfigToReleaseList   SEQUENCE (size
(1..maxNSlots)) of SDM-Pattern-SlotIndex,
    ...
}
SDM-Pattern-SlotConfig ::= SEQUENCE{
    slotIndex      SDM-Pattern-SlotIndex,
    format         ENUMERATED {Format 1, Format 2},
    nRxSymbols     INTEGER (0..maxNSymbols-1),
    nTxSymbols     INTEGER (0..maxNSymbols-1),
}
SDM-Pattern-SlotIndex ::= INTEGER (0..maxNSlots-1)
```

The field descriptions for TABLE 6 are as follows: slotSpecificConfigToAddModList (The IAB-specific resource allocation overwrites an "Undecided" slot in the cell-specific configuration); slotIndex (Index of which slot the IAB-specific configuration applies); nRxSymbols (Number of consecutive symbols allocated to receive parent and child/access link simultaneously using SDM/FDM); and nTxSymbols (Number of consecutive symbols allocated to transmit parent and child/access link simultaneously using SDM/FDM).

F1-AP Information Element (IE) for Semi-Static IAB Resource Allocation

In some aspects, the GNB-DU CONFIGURATION UPDATE message includes a Served Cell Information IE. In this regard, a new F1-AP IE can be defined under Served Cell Information IE to specify the resource allocation for IAB nodes (gNB-DUs). The new IE format may be similar to the new RRC fields defined hereinabove.

L1 Signaling for Dynamic IAB Resource Allocation

In some aspects, new slot format entries may be defined, with each symbol being one of the following resource assignments: (P, DL), (P, UL), (C, DL), (C, UL), and X. The resource assignment entries may be signaled in either an existing DCI format (e.g., DCI 2_0) or a new DCI format. In one embodiment, new slot formats for dynamic IAB resource allocation may be defined as illustrated in the following TABLE 7:

TABLE 7

| | Symbol number in a slot | | | | | | | | | | | | | |
|---|---|---|---|---|---|---|---|---|---|---|---|---|---|---|
| Pattern | 0 | 1 | 2 | 3 | 4 | 5 | 6 | 7 | 8 | 9 | 10 | 11 | 12 | 13 |
| 56 | P,DL | P,DL | P,DL | P,DL | P,DL | P,DL | P,DL | P,DL | P,DL | P,DL | P,DL | P,DL | P,DL | P,DL |
| 57 | P,UL | P,UL | P,UL | P,UL | P,UL | P,UL | P,UL | P,UL | P,UL | P,UL | P,UL | P,UL | P,UL | P,UL |
| 58 | C,DL | C,DL | C,DL | C,DL | C,DL | C,DL | C,DL | C,DL | C,DL | C,DL | C,DL | C,DL | C,DL | C,DL |
| 59 | C,UL | C,UL | C,UL | C,UL | C,UL | C,UL | C,C UL | C,UL | C,UL | C,UL | C,C UL | C,UL | C,UL | C,UL |

TABLE 7-continued

| Pattern | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 60 | X | X | X | X | X | X | X | X | X | X | X | X | X | X |
| 61 | P, DL | X | X | X | C, DL | C, DL | X | X | C, UL | C, UL | X | X | X | P, UL |
| 62 | P, DL | P, DL | X | X | C, DL | C, DL | X | X | C, UL | C, UL | X | X | P, UL, | P, UL |
| 63 | P, DL | P, DL | P, DL | X | C, DL | C, DL | X | X | C, UL | C, UL | X | P, UL | P, UL | P, UL |
| 64 | P, DL | X | X | C, DL | C, DL | C, DL | X | X | C, UL | C, UL | C, UL | X | X | P, UL |
| 65 | P, DL | P, DL | X | C, DL | C, DL | C, DL | X | X | C, UL | C, UL | C, UL | X | P, UL | P, UL |
| ... | ... | ... | ... | ... | ... | ... | ... | ... | ... | ... | ... | ... | ... | ... |

The Overwriting Rule for IAB Resource Allocation

In some aspects, IAB-specific allocation may not overwrite the cell-specific allocation unless in the undecided portion of the time-domain resource allocation.

In some aspects, dynamic resource allocation may not overwrite the semi-static assignment unless in the undecided portion of the semi-static allocation. Based on a CU-DU architecture, the semi-static resource allocations may be signaled via RRC or F1 messages from the CU (donor node). The dynamic resource allocation may be signaled via L1 signaling from a parent DU.

In some aspects, SSB transmissions from the parent IAB node may not be assigned or overwritten as a (P, UL), (C, DL), or (C, UL). SSB transmissions from the IAB node may not be assigned or overwritten as a (P, DL), (P, UL), or (C, UL).

Figure 8:
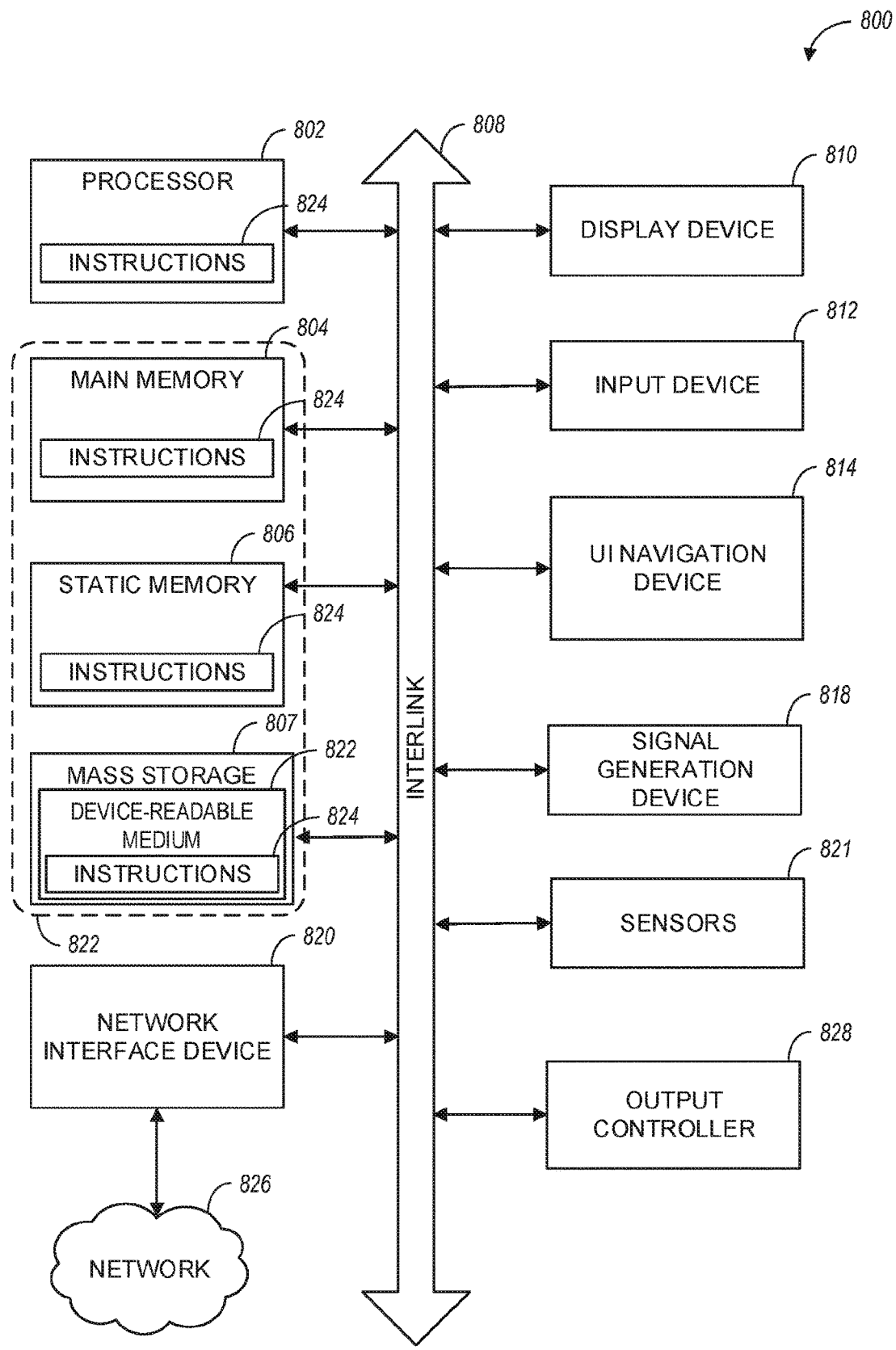
FIG. 8 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 8 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 800 may operate as a standalone device or may be connected (e.g., networked) to other communication devices.

Circuitry (e.g., processing circuitry) is a collection of circuits implemented in tangible entities of the device 800 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 800 follow.

In some aspects, the device 800 may operate as a standalone device or may be connected (e.g., networked) to other devices. In a networked deployment, the communication device 800 may operate in the capacity of a server communication device, a client communication device, or both in server-client network environments. In an example, the communication device 800 may act as a peer communication device in peer-to-peer (P2P) (or other distributed) network environment. The communication device 800 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 800 may include a hardware processor 802 (e.g., a central processing unit (CPU), a graphics processing unit (GPU), a hardware processor core, or any combination thereof), a main memory 804, a static memory 806, and mass storage 807 (e.g., hard drive, tape drive, flash storage, or other block or storage devices), some or all of which may communicate with each other via an interlink (e.g., bus) 808.

The communication device 800 may further include a display device 810, an alphanumeric input device 812 (e.g., a keyboard), and a user interface (UI) navigation device 814 (e.g., a mouse). In an example, the display device 810, input device 812 and UI navigation device 814 may be a touchscreen display. The communication device 800 may additionally include a signal generation device 818 (e.g., a speaker), a network interface device 820, and one or more sensors 821, such as a global positioning system (GPS) sensor, compass, accelerometer, or another sensor. The communication device 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 807 may include a communication device-readable medium 822, on which is stored one or more sets of data structures or instructions 824 (e.g., software) embodying or utilized by any one or more of the techniques or functions described herein. In some aspects, registers of the processor 802, the main memory 804, the static memory 806, and/or the mass storage 807 may be, or include (completely or at least partially), the device-readable medium 822, on which is stored the one or more sets of data structures or instructions 824, embodying or utilized by any one or more of the techniques or functions described herein. In an example, one or any combination of the hardware processor 802, the main memory 804, the static memory 806, or the mass storage 816 may constitute the device-readable medium 822.

As used herein, the term "device-readable medium" is interchangeable with "computer-readable medium" or "machine-readable medium". While the communication device-readable medium 822 is illustrated as a single medium, the term "communication device-readable medium" may include a single medium or multiple media (e.g., a centralized or distributed database, and/or associated caches and servers) configured to store the one or more instructions 824. The term "communication device-readable medium" is inclusive of the terms "machine-readable medium" or "computer-readable medium", and may include any medium that is capable of storing, encoding, or carrying instructions (e.g., instructions 824) for execution by the communication device 800 and that cause the communication device 800 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 824 may further be transmitted or received over a communications network 826 using a transmission medium via the network interface device 820 utilizing any one of a number of transfer protocols. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input-multiple-output (SIMO), MIMO, or multiple-input-single-output (MISO) techniques. In some examples, the network interface device 820 may wirelessly communicate using Multiple User MIMO techniques.

The term "transmission medium" shall be taken to include any intangible medium that is capable of storing, encoding or carrying instructions for execution by the communication device 800, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus comprising:
   a memory; and
   at least one processor in communication with the memory, wherein the at least one processor is configured to cause an Integrated Access and Backhaul (IAB) node to:
   decode radio resource control (RRC) signaling from a central unit (CU) function of an IAB donor node, the RRC signaling specifying a first configuration of first time-domain resources for a parent backhaul link between a mobile termination (MT) function of the IAB node and a distributed unit (DU) function of a parent IAB node;
   decode F1 Application Protocol (F1-AP) signaling from the CU function of the IAB donor node, the F1-AP signaling specifying a second configuration, separate from the first configuration, of second time-domain resources for a child backhaul link between a DU function of the IAB node and a MT function of a child IAB node, wherein the F1-AP signaling specifies a number of uplink symbols, a number of downlink symbols, and a format indicating one of: downlink-flexible-uplink or uplink-flexible-downlink, for the second configuration;

encode uplink data for transmission to the parent IAB node based on the first time-domain resources specified by the first configuration; and encode downlink data for transmission to the child IAB node based on the second time-domain resources specified by the second configuration.

2. The apparatus of claim 1, wherein the IAB node is configured for frequency division duplex (FDD) operation within an IAB network, and wherein the first time-domain resources are orthogonal with respect to the second time-domain resources.

3. The apparatus of claim 1, wherein, when the IAB node is configured for time division duplex (TDD) operation within an IAB network,
the first time-domain resources include uplink and downlink resource assignments for the parent backhaul link, and
the second time-domain resources include uplink and downlink resource assignments for the child backhaul link.

4. The apparatus of claim 1, wherein the RRC signaling and the F1-AP signaling includes a cell-specific resource allocation associated with the first time-domain resources and the second time-domain resources.

5. The apparatus of claim 4, wherein the cell-specific resource allocation is a frequency-division duplex (FDD) cell-specific resource allocation including:
a parent backhaul link-child backhaul link resource allocation pattern;
a periodicity for the resource allocation pattern; and
slots and symbols identification information for cell-specific resources for the parent backhaul link and the child backhaul link.

6. The apparatus of claim 4, wherein the cell-specific resource allocation is a time-division duplex (TDD) cell-specific resource allocation including:
a parent backhaul link-child backhaul link resource allocation pattern;
a periodicity for the resource allocation pattern;
slots and symbols identification information for cell-specific resources for uplink and downlink communications on the parent backhaul link; and
slots and symbols identification information for cell-specific resources for uplink and downlink communications on the child backhaul link.

7. The apparatus of claim 4, wherein the cell-specific resource allocation is a spatial domain multiplexing (SDM)/frequency-division multiplexing (FDM) cell-specific resource allocation including:
an SDM resource allocation pattern;
a periodicity for the SDM resource allocation pattern;
a format for the SDM resource allocation pattern;
slots and symbols identification information for cell-specific resources for uplink and downlink communications on the parent backhaul link; and
slots and symbols identification information for cell-specific resources used for transmission and reception within an IAB network.

8. The apparatus of claim 1, wherein the RRC signaling and the F1-AP signaling includes an IAB-specific resource allocation associated with the first time-domain resources and the second time-domain resources.

9. The apparatus of claim 8, wherein the IAB-specific resource allocation is a frequency-division duplex (FDD) IAB-specific resource allocation including:
a number of consecutive symbols allocated to the parent backhaul link; and
a number of consecutive symbols allocated to the child backhaul link.

10. The apparatus of claim 1, wherein the at least one processor is further configured to:
decode an F1 application protocol (F1-AP) signaling from the CU function of the IAB donor node, the F1-AP signaling configuring the first time-domain resources for the parent backhaul link and the second time-domain resources for the child backhaul link.

11. The apparatus of claim 1, wherein the at least one processor is further configured to:
decode downlink control information (DCI) received via a physical downlink control channel (PDCCH), the DCI including dynamic IAB resource allocation for uplink and downlink communications using the parent backhaul link or the child backhaul link.

12. The apparatus of claim 1, further comprising transceiver circuitry coupled to the at least one processor; and
one or more antennas coupled to the transceiver circuitry.

13. A non-transitory computer-readable storage medium that stores instructions for execution by one or more processors of an Integrated Access and Backhaul (IAB) node, the instructions to configure the IAB node for resource allocation within an IAB network, and to cause the IAB node to:
decode radio resource control (RRC) signaling from a central unit (CU) function of an IAB donor node, the RRC signaling specifying a first configuration of first time-domain resources for a parent backhaul link between a mobile termination (MT) function of the IAB node and a distributed unit (DU) function of a parent IAB node;
decode F1 Application Protocol (F1-AP) signaling from the CU function of the IAB donor node, the F1-AP signaling specifying a second configuration, separate from the first configuration, of second time-domain resources for a child backhaul link between a DU function of the IAB node and a MT function of a child IAB node, wherein the F1-AP signaling specifies a number of uplink symbols, a number of downlink symbols, and a format indicating one of: downlink-flexible-uplink or uplink-flexible-downlink, for the second configuration;
encode uplink data for transmission to the parent IAB node based on the first time-domain resources specified by the first configuration; and
encode downlink data for transmission to the child IAB node based on the second time-domain resources specified by the second configuration.

14. The non-transitory computer-readable storage medium of claim 13,
wherein the IAB node is configured for frequency division duplex (FDD) operation within the IAB network, and the first time-domain resources are orthogonal with respect to the second time-domain resources.

15. The non-transitory computer-readable storage medium of claim 13,
wherein when the IAB node is configured for time division duplex (TDD) operation within the IAB network:
the first time-domain resources include uplink and downlink resource assignments for the parent backhaul link; and
the second time-domain resources include uplink and downlink resource assignments for the child backhaul link.

16. The non-transitory computer-readable storage medium of claim 13,
wherein the RRC signaling includes a cell-specific resource allocation associated with the first time-domain resources.

17. The non-transitory computer-readable storage medium of claim 16,
wherein the cell-specific resource allocation is a spatial domain multiplexing (SDM)/frequency-division multiplexing (FDM) cell-specific resource allocation including:
an SDM resource allocation pattern;
a periodicity for the SDM resource allocation pattern;
a format for the SDM resource allocation pattern;
slots and symbols identification information for cell-specific resources for uplink and downlink communications on the parent backhaul link; and
slots and symbols identification information for cell-specific resources used for transmission and reception within the IAB network.

18. A method for operating an Integrated Access and Backhaul (LAB) node, comprising:
by the IAB node,
decoding radio resource control (RRC) signaling from a central unit (CU) function of an IAB donor node, the RRC signaling specifying a first configuration of first time-domain resources for a parent backhaul link between a mobile termination (MT) function of the IAB node and a distributed unit (DU) function of a parent IAB node;
decoding F1 Application Protocol (F1-AP) signaling from the CU function of the IAB donor node, the F1-AP signaling specifying a second configuration, separate from the first configuration, of second time-domain resources for a child backhaul link between a DU function of the IAB node and a MT function of a child IAB node, wherein the F1-AP signaling specifies a number of uplink symbols, a number of downlink symbols, and a format indicating one of: downlink-flexible-uplink or uplink-flexible-downlink, for the second configuration;
encoding uplink data for transmission to the parent IAB node based on the first time-domain resources specified by the first configuration; and
encoding downlink data for transmission to the child IAB node based on the second time-domain resources specified by the second configuration.

19. The method of claim 18,
wherein the RRC signaling and the F1-AP signaling includes a cell-specific resource allocation associated with the first time-domain resources and the second time-domain resources.

20. The method of claim 19,
wherein the cell-specific resource allocation is a spatial domain multiplexing (SDM)/frequency-division multiplexing (FDM) cell-specific resource allocation including:
an SDM resource allocation pattern;
a periodicity for the SDM resource allocation pattern;
a format for the SDM resource allocation pattern;
slots and symbols identification information for cell-specific resources for uplink and downlink communications on the parent backhaul link; and
slots and symbols identification information for cell-specific resources used for transmission and reception within an IAB network.

* * * * *

UNITED STATES PATENT AND TRADEMARK OFFICE
CERTIFICATE OF CORRECTION

PATENT NO. : 12,238,744 B2
APPLICATION NO. : 17/295080
DATED : February 25, 2025
INVENTOR(S) : Dawei Ying et al.

It is certified that error appears in the above-identified patent and that said Letters Patent is hereby corrected as shown below:

In the Claims

Column 21, Line 38, delete "LAB" and substitute --IAB--.

Signed and Sealed this
Twenty-ninth Day of April, 2025

Coke Morgan Stewart
*Acting Director of the United States Patent and Trademark Office*